3,380,925
POLYGLYCOL ETHERS SUITABLE FOR
DETERGENT PREPARATIONS
Bruno Blaser, Dusseldorf-Urdenbach, and Horst Rutzen, Haan, Rhineland, Germany, assignors to Henkel & Cie, G.m.b.H., Dusseldorf-Holthausen, Germany, a corporation of Germany
No Drawing. Original application July 24, 1963, Ser. No. 297,221. Divided and this application Oct. 17, 1966, Ser. No. 611,486
Claims priority, application Germany, July 25, 1962, H 46,462
3 Claims. (Cl. 252—161)

ABSTRACT OF THE DISCLOSURE

Detergent preparation containing as wash active component at least one of (a) a synthetic organic wash active sulfate compound and (b) a synthetic organic wash active sulfonate compound together with a non-ionic surface active polyglycol ether adduct of alkylene oxide and higher molecular weight aliphatic 1,2-glycol having between about 8–26 carbon atoms in the molecule, about 0.1–0.7 alkylene glycol ether radicals being present in the adduct for each carbon atom present in the aliphatic 1,2-glycol radical; and process of increasing the wetting, washing, cleaning and rinsing capacity of synthetic detergents of the aforementioned type by including therewith a non-ionic surface active polyglycol ether adduct of the foregoing type.

---

This application is a division of U.S. application Ser. No. 297,221, filed July 24, 1963, now abandoned.

The present invention relates to polyglycol ethers suitable for detergent preparations and a process for preparing the same, and more particularly to such polyglycol ethers which are suitable as non-ionic wash-active substances in wetting, washing, cleaning, and rinsing agents, in the form of alkylene oxide adducts of higher molecular weight aliphatic 1,2-glycols.

Water-soluble non-ionic surface-active or capillary active polyethers may be manufactured generally by adding ehtylene oxide onto alcohols of higher molecular weight which contain an aliphatic hydrocarbon radical with 8–20 and preferably about 10–18 carbon atoms in the chain. In this connection, not only have monovalent primary alcohols been used as the alcoholic starting material, but also diols have been proposed for this purpose, wherein the hydroxyl groups are located approximately in the middle of the carbon chain in question as adjacent secondary hydroxyl groups, as for example in the case of 9,10-octadecanediol. Moreover, diols have also been used in which one hydroxyl group is present as a terminal primary hydroxyl group, while the other hydroxyl group is located approximately in the middle of the carbon chain as a secondary hydroxyl group, as for example in the case of 1,12-octadecanediol.

It is an object of the present invention to provide polyglycol ethers suitable for detergent preparations, and a process for preparing the same, especially polyglycol ether adducts of alkylene oxide with higher molecular weight aliphatic 1,2-glycols.

It is another object of the present invention to provide such polyglycol ethers which are suitable as non-ionic wash-active components capable of increasing the wetting, washing, cleaning, and rinsing capacity of synthetic detergents of the organic wash-active sulfate and sulfonate type.

Other and further objects of the present invention will become apparent from a study of the within specification and accompanying examples.

It has been found in accordance with the present invention that polyglycol ethers suitable for detergent preparations as well as a process for their manufacture may now be provided, the polyglycol ethers obtained having especially good technical and commercial usability characteristics. These polyglycol ethers are produced by transforming terminal diols of higher molecular weight, i.e., 1,2-glycols, into water-soluble products by the addition of alkylene oxides.

Specifically, the present invention contemplates a process for the production of non-ionic surface-active polyethers of higher molecular weight diols, which comprises reacting alkylene oxide with higher molecular weight aliphatic 1,2-glycols having between about 8–26, preferably 8–22, and more preferably 10–18 carbon atoms in the molecule at a temperature of between about 50–200° C. and at a pressure at least as high a normal pressure, and recovering the water-soluble polyalkylene glycol ether adduct formed. Conveniently, a mixture of higher molecular weight diols may be used which contains at least about 75% 1,2-glycol content. The alkylene oxide used may be ethylene oxide, or a mixture of ethylene oxide and one or more other alkylene oxides, such as propylene oxide. Generally, the ratio of ethylene oxide to the other alkylene oxide present, and especially propylene oxide, is between about 0.25–4:1, and more preferably between about 0.5–2:1.

Optionally, the propylene oxide may be reacted with the 1,2-glycol first, and thereafter the ethylene oxide caused to react with the addition product formed between the propylene oxide and 1,2-glycol, or the ethylene oxide may first be reacted with the 1,2-glycol and thereafter the propylene oxide caused to react with the addition product previously formed. Moreover, the ethylene oxide and propylene oxide or other alkylene oxide may be reacted with the 1,2-glycol at the same time.

In accordance with one embodiment of the invention, the 1,2-glycol used contains between about 10–18 carbon atoms in the molecule and the temperature of the reaction is between about 80–180° C. while using a catalyst selected from the group consisting of acid and basic catalysts in an amount of between about 0.01–5% by weight based upon the 1,2-glycol present.

Accordingly, non-ionic surface active polyglycol ethers soluble in water at temperatures of at least about +5° C. may be provided by such addition of alkylene oxide on to higher molecular weight aliphatic 1,2-glycols having between about 8–26 carbon atoms in the molecule at a temperature of between about 50–200° C. and at a pressure at least as high as normal pressure. Such polyglycol ethers may be made with ethylene oxide or a mixture of ethylene oxide and propylene oxide in the aforesaid molar ratio of ethylene oxide:propylene oxide of between about 0.25–4:1.

The polyglycol ether adduct of alkylene oxide and higher molecular weight aliphatic 1,2-glycol having between about 8–26 carbon atoms in the molecule, according to the present invention, should contain about 0.13–0.45 alkylene glycol ether radicals in the adduct for each carbon atom present in the aliphatic 1,2-glycol radical, the adduct being non-ionic, surface active and water-soluble at temperatures of at least about plus 5° C. The adduct should also have a turbidity point of between about 20–105° C. and more particularly between about 35–65° C., especially where the aliphatic 1,2-glycol contains about 10–18 carbon atoms in the molecule.

It should be noted that where the aliphatic 1,2-glycol contains between about 8–14 carbon atoms in the molecule, the adduct should contain preferably about 2–3 ethylene glycol ether radicals. Where the aliphatic 1,2-glycol contains between about 12–16 carbon atoms in the molecule, the adduct should contain about 3–4 ethylene glycol ether radicals. On the other hand, where the aliphatic 1,2-glycol contains between about 16–20 carbon atoms in the molecule, the adduct should contain about 4–6 ethylene glycol ether radicals. Generally, therefore, where the aliphatic 1,2-glycol contains between about 8–20 carbon atoms in the molecule, the adduct contains about 2–10 ethylene glycol ether radicals.

Where the adduct contains ethylene glycol radicals and propylene glycol radicals, it will be appreciated that the propylene glycol radicals may stand in the adduct between the aliphatic 1,2-glycol radical and the ethylene glycol radical, or the ethylene glycol radicals and the propylene glycol radicals may be present in the adduct in random distribution. Of course, the propylene glycol radicals may also be bound to the aliphatic 1,2-glycol radicals through the ethylene glycol radicals present. Actually, in accordance with one preferred embodiment of the invention, between about 1–12 propylene glycol radicals are present in the adduct and for each such propylene glycol radical between about 0.25–4 ethylene glycol radicals are also present, the total number of ethylene glycol radicals present in the adduct also satisfying the requirement noted above that there be present at least about 0.13–0.45 ethylene glycol radicals for each carbon atom present in the aliphatic 1,2-glycol radical. The number of ethylene glycol radicals present may be counted only once in determining the amount necessary to satisfy additively the molar ratio range of 0.25–4 and the molar ratio range of 0.13–0.45 per aliphatic carbon atom. In short, the number of ethylene glycol radicals required for each carbon atom in the aliphatic 1,2-glycol radical is to be added with the number of ethylene glycol radicals required for the number of propylene glycol radicals present.

Consequently, the present invention represents an improvement in a detergent preparation containing as wash active component at least one of a synthetic organic wash active sulfate compound and a synthetic organic wash active sulfonate compound, which comprises including therein the non-ionic, surface active polyglycol ether adduct of alkylene oxide and higher molecular weight aliphatic 1,2-glycols of the present invention as more fully described hereinabove. The adduct should be present in an amount of at least about 65% by weight based upon the total quantity of adduct and wash active detergent in the detergent preparation in question. The adduct should also be present in an amount of at least about 5% by weight based upon the entire formulation of the detergent preparation. Moreover, in accordance with one preferred embodiment of the invention a fatty acid ester sulfonate is included as the wash active sulfate compound.

The detergent preparation may contain as wash active component suitably a member selected from the group consisting of synthetic organic wash active sulfate compounds, synthetic organic wash active sulfonate compounds, and mixtures thereof in admixture with the non-ionic, surface active polyglycol ether adduct of the present invention. In this way the present invention represents an improvement in the process of increasing the wetting, washing, cleaning, and rinsing capacity of synthetic detergents having organic wash-active compounds of the sulfate and sulfonate type, which comprises including the non-ionic surface-active polyglycol ether adduct of the present invention in the detergent preparation in question.

For the transformation of terminal glycols of higher molecular weight, i.e., 1,2-glycols, into water-soluble products by the addition of alkylene oxides, terminal glycols may be used as starting materials which are obtainable from terminal aliphatic olefins having 8–26, and preferably 8–22 carbon atoms in the molecule, and most particularly 10–18 carbon atoms in the molecule. These olefins include octylene, nonylene, decylene, hexadecene, eicosene, docosene, etc. Such terminal olefins are obtainable in good yields and high concentrations by the cracking of paraffin hydrocarbons by appropriate methods, for example. Such olefin hydrocarbons are of an aliphatic nature as the artisan will appreciate. The olefins may be straight-chain or branch-chain aliphatic olefins containing 8–26 carbon atoms, such as alkyl, including octyl-, nonyl-, decyl-, hexadecyl-, eicosyl-, docosyl-, etc., e.g. ethylhexyl, propylhexyl, butylhexyl, etc. groups containing terminal olefinic or ethylenic unsaturation, whereby in turn corresponding $C_{8-26}$ alkane 1,2-diols will be formed.

Specifically, the transformation of these terminal olefins into the desired terminal glycols may be performed by various methods, such as for example the process according to Swern, Journal of the American Chemical Society, vol. 68 (1946), pages 1504–1507, by transposition with hydrogen peroxide and formic acid or acetic acid, followed by hydrolysis of the semiester that then develops. Nevertheless, the olefins can also be transformed to the 1,2-glycols by other methods, using hydrogen peroxide, as for example by transforming the olefins into terminal epoxies and hydrolyzing the latter to glycols, by the adding on of hypochlorous acid and the saponification of the resulting chlorhydrins, or also by direct oxidation of the olefins with the oxygen found in the air according to the process of German Patent 734,838, which corresponds to the subject matter of U.S. Ser. No. 287,332, filed in 1939, now apparently abandoned.

The glycols produced as crude products by any one of the above-mentioned procedures, preferably in a mixture with the starting olefins or the saturated hydrocarbons accompanying the same, possess a substantially higher boiling point than the hydrocarbons used for their manufacture. Hence, the hydrocarbons and glycols can be separated extensively by distillation procedures, if the starting hydrocarbons were not fractions of all the same C-number but rather were mixtures of homologs without excessively great or broad ranges of C-number. Obviously, allowance must be made for the formation of azeotropes. If, on the other hand, mixtures of glycol and hydrocarbon having overlapping boiling ranges have to be separated, the glycols and the hydrocarbons can be separated from one another by crystallization or extraction. In this regard, low aromatic hydrocarbons, such as unsubstituted and lower alkyl substituted arylhydrocarbons, including mono- and di-lower alkyl substituted benzene hydrocarbons have proven to be good solvents for such recrystallization, especially benzene, toluene, and xylene.

According to the present invention, it is preferred that the 1,2-glycols to be processed are higher percentage mixtures, i.e. in which at least 75% by weight and more particularly 85% by weight, and especially more than 95% by weight of 1,2-glycols are present, so that any hydrocarbons that may exist in the final product will be comparatively unimportant. However, such residual hydrocarbons can still be distilled off, perhaps together with any unreacted glycol that may be present.

For the transformation of the terminal glycols (i.e., saturated aliphatic hydrocarbon 1,2-diols, or saturated aliphatic hydrocarbon 1,2-glycols, e.g., produced by any of the aforesaid processes) into their non-ionic, surface active or capillary active, water-soluble polyglycol ethers, ethylene oxide is added on, which can be used alone or together with other alkylene oxides, such as propylene oxide, butylene (butene) oxide, amylene (pentene) oxide, hexylene (hexene) oxide, heptylene (heptene) oxide, octylene (octene) oxide, etc. In the latter instance, and especially where one of the higher alkylene oxides is used and in particular propylene oxide, any desired order of addition of the alkylene oxides onto the 1,2-glycol may be used. Thus, the propylene oxide may be added on before the ethylene oxide, the oxide of ethylene and the propylene oxide may be used in admixture and thus added on in random arrangement, or lastly, the ethylene oxide can be added on first, and thereafter the propylene oxide. The same is actually true for all alkylene oxides, and especially the lower alkylene oxides. In all cases, the quantity ratio of ethylene oxide to propylene oxide, or other higher alkylene oxide, is to be adjusted so that the polyethers obtained are still soluble at temperatures of at least about 20° C., i.e. about ordinary or room temperatures. The ratio of ethylene oxide to propylene oxide, or other higher alkylene oxide, may range as aforesaid approximately between 4:1 and 1:4 (i.e. 0.25–4:1) and preferably between 2:1 and 1:2 (i.e. 0.5–2:1). The addition of the alkylene oxide to the glycols in question is performed preferably at elevated temperatures of 50–200° C. for example preferably between about 80–180° C. at normal or elevated pressure as for example up to about 25 atmospheres absolute or even higher. The reaction is generally accelerated by basic or acid catalysts.

Among the basic or alkaline catalysts which may be used are the metals sodium and potassium, or their hydroxides, or soaps, such as aliphatic or fatty acid soaps, and primarily their alcoholates such as aliphatic alcoholates and especially fatty alcoholates and most preferably alkylolates. In addition to the preferentially used methylates, it is generally possible to use the aliphatic alcoholates of monopalent to hexavalent alcohols having 1 to 7 carbon atoms in the molecule. Significantly, however, the terminal glycols to be processed in accordance with the present invention to form the desired products may themselves be used as catalysts, i.e. in the form of their alcoholates, for instance, by dissolving free alkali metals, such as sodium and/or potassium in them. The quantity of basic catalyst amounts to approximately 0.01–5% by weight and preferably 0.05–0.5% by weight, of the alkali metal used with reference to the starting material, i.e. aliphatic 1,2-glycol.

On the other hand, the group of acid catalysts which may be used in this connection includes compounds such as boron trifluoride, for example, which is usually used in the form of its addition compounds, and also the halides of zinc, iron or aluminum, such as the chlorides, bromides, iodides and fluorides of these metals, as well as the chlorides bromides of tetravalent tin and pentavalent antimony. The acid catalysts are usable in approximately the same quantities as the basic or alkaline catalysts, i.e. 0.01–5% by weight and preferably 0.05–0.5% by weight with reference to the starting material, i.e. the 1,2-glycol being transformed.

In the polyglycol ethers obtained in accordance with the foregoing, the polyglycol ether chain is in all probability bound to the oxygen atom of the primary diol hydroxyl moiety, while the secondary diol hydroxyl moiety probably stands as a free hydroxyl group. However, there is no absolute certainty as to the correctness of this assumption, and it may also be that at least a part of the alkylene oxides to be transposed with the diol has reacted with the secondary diol hydroxyl. It will be understood in this connection that the present invention is not meant to be limited to any specific theory of the linkages between the polyglycol ether chains and the 1,2-glycol moieties.

Generally, the amounts of ethylene oxide to be added on or combined with the 1,2-glycol in order to achieve water solubility are smaller than in the case of fatty alcohols of equal chain length. Thus, two or three to 10 mols of ethylene oxide are required per mol of glycol, depending upon the C-number of the glycol used. Large amounts, of course, may also be added, as much as 40 mols, for example, of ethylene oxide per mol of the glycol used. Of course, these figures can be larger in the case of mixed ethylene glycol and higher alkylene glycol ethers, such as propylene glycol ethers.

It will be realized that the minimum amount of ethylene oxide required for the achievement of sufficient water solubility for surfactant use will vary with the chain length of the diols to be processed. In this regard, with the lower compounds of the series, such as diols having 8–14 carbon atoms, the addition of 2–3 molecules of ethylene oxide per diol molecule will suffice. On the other hand, where diols with 12 to 16 carbon atoms in the molecule are concerned, products which are readily water soluble are often achieved by the addition of only 3–4 mols of ethylene oxide. With the higher members of the series, i.e. those having 16–20 carbon atoms in the molecule, somewhat more ethylene oxide obviously has to be added on for the desired purpose, as for example 4–6 mols thereof. Indeed, products are also usable which contain even larger amounts of ethylene glycol ether radicals in the molecule, as for instance those having more than 10 and up to 20 ethylene glycol ether radicals. In general, unless the radicals of higher glycols are present in the molecule, such as propylene glycol or butylene glycol, etc., it is not necessary to go beyond 10 ethylene glycol ether radicals, and in the case of compounds containing up to 16 carbon atoms in the diol radical not beyond 6 ethylene glycol ether radicals, in order to achieve the desired surface active or capillary active water soluble characteristics desired.

Generally, where no propylene glycol radicals are present in the diol polyglycol ether product of the present invention, the total number of ethylene glycol radicals present therein should be at least 1, such total number also satisfying the requirement that 0.1–0.7, preferably 0.12–0.55, and more preferably 0.13–0.45 ethylene glycol radicals be present for each carbon atom of the diol radical. Where the product contains additionally propylene glycol radicals, i.e. in an amount of from 1–12 per diol molecule, an additional amount of ethylene glycol radicals to the aforesaid total number must be present. In the latter case, the combined total number of ethylene glycol radicals which must be present in the product includes (1) the total calculated on the basis of the number of carbon atoms in the diol radical and (2) the amount necessary on the basis of the number of propylene glycol radicals present in accordance with the aforesaid ratio of 0.25–4, preferably 0.5–2 ethylene glycol radicals per propylene glycol radical.

If the new diol polyglycol ethers of the present invention are to be used as wetting agents and detergents, or in detergent preparations, end products are selected which possess a degree of ethoxylation that the turbidity points will lie approximately in the range of the application temperature for the agents and/or detergent preparations, or, preferably somewhat higher than the application temperature. If aqueous solutions of the diol polyglycol ethers are to be used at temperatures ranging from 15 to 25° C., for example, polyglycol ethers having turbidity points of at least 20–35° C. should be used, whereas if the application temperature for the products in question ranges from 30 to 50° C., it is expedient and appropriate to use polyglycol ethers having turbidity points of 35–55° C. Moreover, if the application temperature lies in the range of 60–100° C., it is expedient to select products having turbidity points of from 65–105° C. All of the foregoing temperature data and requirements actually mean that the amount of surface active polyglycol ether which is adequate for the intended effect should possess a higher turbidity point than the application temperature involved for the particular product. This should be true in general of at least 50%, preferably more than 75%, and especially 85–100% of the amount of the diol polyglycol ether in question, for example where the detergent preparation being used at a particular application temperature contains a mixture of diol polyglycol ethers, some of which have a higher turbidity point than others for the particular application temperature in question.

Nevertheless, the polyglycol ethers to be used in accordance with the present invention may in part possess lower turbidity points, the percentage of these being the difference between the above-stated percentages and 100%. The lower turbidity points may be attributed to incomplete ethoxylation or to the presence of propylene or butylene glycol radicals, and/or higher alkylene glycol radicals, in the molecule, which latter radicals are not as effective for the desired purpose at least on a one for one comparison basis with ethylene glycol. Any such compounds, whose turbidity point may be as low as +5° C., but which is preferably between 5–10° C., and especially between 10–20° C., need not interfere with the use of the more water soluble diol polyglycol ethers in practice at the application temperature involved.

Advantageously, the aqueous solutions of the surface-active diol polyglycol ethers in accordance with the present invention are suitable for the treatment of the surfaces of any kind of solids and this treatment can be performed in industrial or commercial operations, or also under household conditions. These applications include, for example, all kinds of textile treatments, especially washing, and the treatment, and especially the cleaning, of surfaces of solids other than textiles, such as metal, wood, ceramic products, such as porcelain, especially porcelain dish ware, plain tiles, glazed tiles, and glass. Plastics and lacquered and polished surfaces can also be treated with the aqueous solutions of the diol polyglycol ethers of the present invention. In particular, with respect to the rinsing of dishes, which may be performed by hand or in the more or less automatic operating apparatus now available, such as dish washers, the aqueous solutions of the diol polyglycol ethers in question produce a good draining effect, which is apparent both with dish ware of ceramic materials as well as with plastic dish ware and metals. The rinsing liquid wets the entire surface of the dish ware, drains evenly away and dries without streaking. This effect can also be exploited, of course, in the case of all other kinds of industrial and commercial treatments of metal or other substances.

The advantageous properties of the new diol polyglycol ethers can be observed effectively not only when they are used in the form of their aqueous solutions without any additives, but also when used with the usual additives, the nature of which will depend upon the application under consideration.

Thus, as non-ionic surfactants, the diol polyglycol ethers of the present invention are compatible both with acids and with alkalis and therefore they can be combined with acids, salts of acid, neutral or organic reaction, and bases as well. The pH values of the aqueous treating solutions containing surface active diol polyglycol ethers of the present invention may range from 1 to 12, depending upon their intended application. The acid pH range is desirable primarily for many purposes in the treatment of metals, such as acid cleaning of metals, economical pickling, etc. Fine detergents, rinsing agents, and cleansers for household use may also be included and these are generally almost neutral to weakly alkaline, i.e., their aqueous, ready-for-use solutions have pH values ranging from 6–9 and preferably 7–8.5. The aqueous solutions of strong detergents generally have higher pH values, as for example from 9–11.5 and preferably from 9.5–10.5. Solutions which are still more strongly alkaline, having pH values from 11–12, are important for the cleaning industry in particular, and more specifically in the food industry, such as in the beverage industry, the dairy industry, etc. where the containers must be scrupously cleaned before use.

Acid substances which are suitable for use together with the diol polyglycol ethers of the persent invention include the usual organic or inorganic acids or acid salts, including the alkali and ammonium salts, such as hydrochloric acid, sulfuric acid, bisulfates of the alkalies, aminosulfonic acids, nitric acid, orthophosphoric acid or other acids of phosphorous, especially the anhydrous acids of phosphorus, i.e. metaphosphoric, and pyrophosphoric acids, etc. or their acids salts, especially the alkali and ammonium salts, or their acid reacting solid compounds with urea or other low carboxylic acid amides, partial amides of phosphoric acid, or of the anhydrous phosphoric acids, citric acid, tartaric acid, lactic acid, oxalic acid, etc.

The approximately neutral or weakly alkaline or strongly alkaline treating liquids which may be used in accordance with the present invention may contain the additives customarily used in washing, cleaning, and rinsing preparations, together with surfactants. These additives include not only neutral salts, such as sodium sulfate, which is able to improve the effectiveness of the wash active component even when used alone, but also wash active alkali reacting salts, such as the alkali carbonates and bicarbonates, water-soluble alkali silicates, alkali orthophosphates, etc., which are most preferred and especially sodium carbonate, disodium phosphate, trisodium phosphate, etc. Moreover, the additives may also contain anhydrous phosphates including the pyrophosphates, which insofar as they do not contain any hydrogen atoms replaceable by metals are sufficiently alkaline to serve as wash-active alkalies, and the polyphosates, such as, for example tripolyphosphate $Na_5P_3O_{10}$ and tetrapolyphosphate $Na_6P_4O_{13}$. The polymetaphosphates are also usable in this connection, although such metaphosphates in polymeric form because of their slightly acid reaction should be employed only at most in such quantities that the alkaline reaction of the other components of the detergent is not counteracted. Conveniently, the slightly acid-reacting metaphosphates may be employed, for example, in the production of fine wash agents for the purpose of standardizing the lower pH values. In this connection, the acid orthophosphates or pyrophosphates noted above may also be used for standardizing the pH values of the detergent preparation as well as the weak inorganic or organic acids or acid salts of strong organic acids, such as boric acid, citric acid, oxalic acid, lactic acid, glycolic acid, tartaric acid, sodium bisulfate, etc.

The usual organic chelate formers may also be present in the detergent preparations in accordance with the present invention, these chelate formers often being derivatives of mono- or poly-amines, wherein the basic nitrogen atoms are substituted with lower radicals containing carboxyl or hydroxyl groups. This is especially true with respect to carboxyl or hydroxyl groups of an aliphatic or cycloaliphatic nature having from 1 to 6 carbon atoms, with a plurality of such radicals being able to be bound to one nitrogen atom. Examples of such substances include: ethylene diaminotetraacetic acid, nitrilotetraacetic acid, monohydroxyethylethylenediaminetriacetic acid, etc.

In addition to the foregoing, in accordance with the present invention, the known percompounds may be included in the detergent preparations in question, such as the hydroperoxides of sodium borate, alkali carbonates, alkali-orthophosphates, alkali pyrophosphates, alkalipolyphosphates, etc. Of course, stabilizers may be used together with these per compounds, and the same may be water-soluble or water-insoluble. In the case of water-soluble stabilizers, these include, in addition to the above-mentioned complex formers, dipicolinic acid, quinaldinic acid, quinolinic acid, and acylation products of phosphoric acid, for example according to German Patent 1,107,207, which substantially corresponds to the products disclosed in U.S. application Ser. No. 29,778, filed 1960 and Ser. No. 170,221, which represents a continuationin-part application thereof. On the other hand, the water-insoluble stabilizers include various very finely divided, large-surface solids, such as silicic acid, alkaline earth silicates produced by precipitation, especially magnesium silicate, and also meta-stannic acid and the like.

The effect of the per compounds can be intensified effectively by the customary activators, such as, for example, small amounts of heavy metal ions, especially copper ions. Since such ions, however, act as catalysts for the decomposition of the per compounds, the same cause an undesirably rapid evolution of oxygen, and therefore such activators have to be applied in bound form. Specifically, the activators may be used together with an excess quantity of complex formers, such as the above-mentioned chelate formers, or with large-surface substances like magnesium silicate, metastannic acid, etc. In this connection, a particular combination of magnesium silicate, small amounts of copper and aminopolycarboxylic acids has proven to be a good activator. Also, organic substances have proven to be useable advantageously as activators, such as benzoic acid anhydride, other carboxylic acid anhydrides, propiolactone and other beta-lactones, etc.

The surface-active diol derivatives to be used according to the present invention, i.e. which possess a lower sudsing ability than that of many anionic wash-active substances, can be used advantageously together with substances which influence the sudsing ability of their aqueous solutions. With these anionic wash-active substances, the preparations are especially suitable as wash-active substances in machine laundrying, as for example in household automatic washing machines. Of course, it may be desirable to reduce the sudsing ability even further. To this end, the foaming diol-ethyleneglycolethers of the present invention can be combined, as generally described in German application 1,135,122, which corresponds with U.S. application Ser. No. 99,650, filed 1961, and U.S. application Ser. No. 276,983 which is a continuation-in-part thereof, with nonionic products in which the end of the polyethylene glycol chain opposite the hydrophobic radical contains polypropylene glycol radicals which reduce the water-solubility. The hydrophobic radical may also originate from 1,2-diols.

Furthermore, inorganic or organic colloid substances, water-soluble substances of higher molecular weight, etc. can be included as additives in the preparation in accordance with the present invention, these colloid substances serving as dirt carrier in the washing process. In general, the colloids improve the dirt-carrying capacity of the synthetic wash-active substances used and such colloids include, among others, water-soluble salts of polyacrylic acid or polymethacrylic acid, water-soluble salts of polymeric carboxylic acids, glue, gelatin, salts of ether carboxylic acids, or ether sulfonic acids of starch or cellulose as well as salts of sulfuric acid esters of cellulose or starch, and especially carboxymethylcellulose, ethers of cellulose and hydroxyalkylsulfonic acids as well as cellulose sulfates, and the like.

As synthetic wash-active substances which may be used in accordance with the present invention in the detergent preparation in question, these include any of the well-known anionic capillary active or wash-active substances having hydrophobic radicals, as for example, a straight chain or branched chain, saturated or unsaturated aliphatic hydrocarbon radical having 8 to 22 and preferably 10 to 18 carbon atoms, and water-solubilizing groups of the sulfate or sulfonate type so as to lower the surface tension of the water or aqueous washing solution. Among the substances specifically contemplated are the alkyl sulfonates, the alkyl benzene sulfonates, fatty acid sulfonates, salts, esters, etc., fatty alcohol sulfates, and olefin sulfonates, as well as fatty alcohol glycerin ether sulfates, fatty alcohol polyglycol ether sulfates, fatty acid mono- or di-glyceride sulfates, etc. The hydrophobic radical, of course, may also be connected with a sulfonate or sulfate group by means of a phenyl radical and/or a hetero atom, such as an intermediate member containing ether oxygen atoms. This is illustrated, for example, by the alkyl benzene sulfonates, sulfo-succinic acid esters, or other sulfo-dicarboxylic acid esters, tetrapropylene phenyl ethyl sulfates, alkylphenoxy ethyl sulfates or alkylphenoxy polyalkylene glycol sulfates, fatty alcohol glycerin ether sulfonates, having, for example 1–10 and preferably 1–5 polyethylene glycol moieties in the molecule, fatty acid mono- or di-glyceride sulfates, fatty acid alkylol amide sulfates, etc. The foregoing anionic wash active detergent substances are generally known and need not be defined in any detail as will be appreciated by the artisan.

In the preparation of aqueous detergent solutions, in accordance with the present invention, the surface-active diol derivatives in question and any additives of the foregoing type which are to be used may be dissolved in the water content either simultaneously or in any desired order. It is possible also, however, to use ready made or already formulated preparations such as solids which already contain all of the substances required for the particular purpose. Generally, however, the ready-made preparations can be used as concentrates in liquid or paste form, or else in the form of solids, such as pourable granular substances, including more or less fine powders, granulates, or agglomerates as well as in shapes obtained in some particular manner, such as flakes, ribbons, needles, etc.

In any case the formulations making up the detergent preparations should be adjusted so that the desired pH will be obtained in the washing solution to be utilized, the pH generally being determined with respect to a 1% solution of the washing agent, whereby, depending upon the demands made on the detergent preparation, pH values between 1 and 12 are possible.

The aliphatic 1,2-glycol ethers obtained in accordance with the present invention may also be present as nonionic wash-active or capillary active substances in pourable and sprinklable form, and especially powdered detergents, wetting agents and emulsifiers, i.e. which additionally contain surface-active salts of sulfo fatty acid esters and salts of sulfo fatty acids having 10 to 24 and preferably 12 to 18 carbon atoms in the molecule. It will be realized, nevertheless, that the percentage of the aliphatic 1,2-polyglycol ethers of the present invention should be at most about 65% by weight with reference to the mixture of the 1,2-polyethylene glycol ether and surface-active ester salt in question. Of course, where the diol polyglycol ethers of the present invention are used as wetting agents, detergents, cleansers, and rinsing agents, they may also be used in greater percentages than 65% by weight, as well as without any of the abovementioned surface-active salts of sulfo fatty acid esters and sulfo fatty acids being present whatsoever.

Because of the oily to pasty consistency and the property of not gelling or not gelling so strongly when water is added, as is the case with the surface-active fatty alcohol polyglycol ethers derived from monovalent alcohols, the products according to the present invention are especially suited for the production of liquid to pasty preparations into which common or usual attendant substances can also be worked. In this connection, if substantially monophase, practically clear, solutions are desired, the substances to be worked in are used in easily soluble form. For example, the wash active alkalies or other additievs can be used in the form of their readily soluble salts, i.e. sodium or potassium salts or amine salts, especially the alkylolamines. Of course, it is possible to use a plurality of the above-mentioned cations, for instance, sodium and potassium salts may be used together, or potassium salts and triethanolamine salts may be used together or sodium and potassium and triethanolamine salts may all be used together, etc.

Furthermore, known solubilizers can be worked into the detergent preparations in question, these including not only water-soluble organic solvents, but also the so-called hydrotropic substances on the order of the lower arylsulfonates, such as toluene or xylene sulfonates. Of course, these substances may also be present in the form of their sodium and/or potassium and/or alkylolamine salts. Furthermore, such water-soluble organic solvents are especially usable as solubilizers where the same have boiling points above about 75° C., such as the ethers of similar or different polyvalent alcohols or the partial ethers of polyvalent and monovalent alcohols such as the alkylols. More specifically, these include, for example, di- or tri- ethylene glycol, polyglycerins and the partial ethers made up of ethylene glycol, propylene glycol, or glycerin and aliphatic, monovalent alcohols containing 1 to 4 carbon atoms in the molecule.

Although the solubility of the water-soluble solids contained in the concentrates in question can be increased by the above-described methods, the artisan is often faced with the problem of preparing concentrates having a degree of concentration that clear solutions can no longer be produced despite the availability of the methods noted above. In such cases, there are several ways of arriving at stable suspensions in which the suspended substances practically do not settle out or at least can be shaken back easily into suspension. The settling tendency decreases as the particle size of the solids correspondingly decreases, as the difference in the specific gravities of the liquid and of the solid therein suspended decreases, and as the viscosity of the liquid increases. Even by means of a substantial reduction in the particle size of the suspended solids, it is possible to obtain usable products herein. For instance, it has been proposed to prepare a thixotropic liquid detergent by providing for a sufficiently small particle size in the tripolyphosphate to be incorporated into such liquid detergent in solid form. If the solids are of the kind that crystallize, i.e. absorbing water of crystallization, then it is recommendable to prevent this from happening by the addition of alcohols, especially polyvalent aliphatic alcohols, such as glycols or glycerin or their partial ethers. At the same time, an increase in the specific gravity of the liquids is also achieved as well as a certain increase in viscosity, whereby the over-all stability is improved as well.

To increase the viscosity, it is also recommended to add higher polyglycol ethers or polyglycerins or other water-soluble substances of high molecular weight, such as those indicated above as dirt-carrying substances.

In spite of the oily to pasty consistency of the aliphatic 1,2-polyethylene glycol ethers obtainable in accordance with the present invention, the same can be transformed into powders by the usual methods. Specifically, these methods include, for instance, the binding of the water present in an aqueous solution of the diol polyglycol ethers in question by means of calcined salts which crystallize and bind water of crystallization. In another method, the diol polyglycol ethers of the invention are absorbed by finely divided calcined salts, such as those obtained in a very voluminous state, in some cases, by the dehydration of the salts containing water of crystallization. Soda made by the heating of sodium bicarbonate can be used for this purpose as well as fine-grained, voluminous anhydrous phosphates which weigh less than 550 grams per liter. Still another method that can be used for the production of preparations in accordance with the invention consists in preparing a fluid slurry of the diol polyglycol ethers in question and hydratable inorganic salts, then stirring and bubbling air through the mixture until semisolid particles have formed, and thereafter allowing the mixture to stand until a solid, friable mass has developed of apparently dry, coherent, spherical, agglomerated granules, and finely breaking up such mass into granules.

The following examples are set forth for the purpose of illustrating the present invention, and it will be understood that the invention is not to be limited thereby:

Example 1

In order to form the addition product, a starting material was used which consisted of octadecanediol-1,2, which had been made according to Swern, "Journal of the American Chemical Society," vol. 68 (1946), pages 1504 to 1507, from a terminal octadecene, by transposition with hydrogen peroxide and formic acid, followed by hydrolysis of the diol semiester that first develops. The octadecene-1 used to form the diol is a commercial product made by the cracking of paraffin wax, having a terminal olefin content of about 97%. The rest consisted in part of non-terminal olefin or of paraffin. The octadecanediol-1,2 was purified by distillation (B.P. 178–184° C./0.05 mm. Hg) and had a hydroxyl number of 392.

The ethoxylation of this product was performed in a three-necked flask equipped with a heating device, a contact thermometer, an agitator and a gas inlet and outlet tube. To 95.3 grams of the above-described octadecanediol, 3.5 grams of a methanolic solution of sodium methylate (10% by weight Na) were added, and the mixture was heated to 120–130° C. The methanol then was removed by evacuating the flask three times followed each time by scavenging with nitrogen. Then, beginning at a temperature of 166° C., 89 grams of ethylene oxide gas were passed through the ingredients in the flask. The heat of reaction raised the temperature rapidly at first to 176° C., but thereafter the temperature was held by cooling to about 150° C. After the above-stated amount of ethylene oxide had been passed through the ingredients in the flask, the weight increase amounted to 88.3 g. The reaction product was washed five times, each time with 200 cc. of 5% hot sodium sulfate solution. The water released was removed under vacuum at 150° C. and the separated sodium sulfate was filtered off. A yield of 164 grams was obtained of a polyglycol ether which contained about 6 mols of ethoxyl radicals per mol of diol. The hydroxy number of the product was 194 and it dissolved in water at 35–40° C. A 1% aqueous solution thereof had a turbidity point of 90° C.

Example 2

In accordance with the procedure described in Example 1, 30 grams of the octadecanediol described in Example 1 were ethoxylated in the same apparatus. To this end, 3 g. of a methanolic solution of sodium methylate (10% by weight Na) were added and the methanol was driven off. After scavenging out the gas space, with nitrogen, the passage of ethylene oxide (124 g.) through the mixture was begun. Since the absorption of the ethylene oxide at 155° C. was slow at first, the temperature was increased to 175–185° C. and the reaction was continued for 230 minutes. After an overnight interruption, the balance of the ethylene oxide was fed in within 70 minutes at 161–176° C. The weight increase then amounted to 122 g. After washing, drying and filtering, the yield was 114 g. On the basis of the weight increase, a content of 26 ethylene glycol radicals is calculated per molecule of octadecanediol. The hydroxyl number of the solid product obtained was 79.1.

Example 3

The starting material in this case was a mixture of terminal diols with 14 to 16 carbon atoms in the molecule, which had been produced from an appropriate olefin in the manner described in Example 1. The diol mixture had a boiling range of 159–220° C. at 0.1 mm. Hg and a hydroxyl number of 397.

In accordance with the procedure of Example 1, 4.6 g. of a methanolic solution of potassium methylate containing 5% by weight potassium (calculated as the free metal) were added to 87 g. of the above diol. After driving off the methanol in the above-described manner, 71.5 g.

ethylene oxide were passed through the mixture within 120 minutes, beginning at a temperature of 155° C. At the initiation of the reaction, the temperature first rose to 160° C., and was then held at about 150° C. by cooling. The yield amounted to 142.4 g. An average content of 4.9 ethyleneglycol radicals is calculated from the weight increase. The hydroxy number of the product amounted to 220. The turbidity point of a 1% aqueous solution was 80° C.

Example 4

The starting material was a tridecanediol-1,2, which had been obtained from the corresponding olefin by transforming the latter to the epoxy form, transposing the epoxy with acetic acid anhydride to form the glycoldiester, and cleaving the later. The tridecanediol passed over in the distillation in the range of 127–128° C./0.05 mm. Hg and had a hydroxy number of 511.

In accordance with the procedure of Example 1, 110 g. of this tridecanediol were heated to 100° C. in the apparatus described above and 0.3 g. of metallic sodium was added. After the sodium had dissolved, the temperature was raised to 160° C. and, after scavenging the apparatus with nitrogen, ethylene oxide was passed through until the weight increase amounted to 93 grams. The reaction product was washed five times at 90 to 100° C. with 400 cc. of 5% sodium sulfate solution each time, free of water under vacuum at 130–150° C., and filtered while still hot. The yield amounted to 178.5 grams. The hydroxyl number of the product was 278. On the basis of the ethylene oxide absorption, a content of 4 glycol ether radicals per molecule is calculated. The turbidity point of the product in a 1% aqueous solution was 65° C. whereas in a 1% solution of the product made with a 5% sodium chloride solution, the turbidity point was 42.5° C.

Example 5

The starting material was a pentadecanediol-1,2, which had been produced from the corresponding olefin in a manner similar to the one described in Example 1. However, the quantity of formic acid used in that example was replaced by 1.15 times its volume of acetic acid, and furthermore a small amount (0.57% of the volume of the acetic acid used) of concentrated sulfuric acid was added. The diol obtained was purified by distillation and passed over at 144–150° C./0.05 mm. Hg. It had a hydroxyl number of 431.

Under the same conditions as described in the preceding example, 52 grams of the pentadecanediol-1,2 thus obtained were treated by dissolving 0.2 g. of metallic sodium therein, and ethoxylated at 160° C. until 51 grams of ethylene oxide had been absorbed. The reaction product was washed 3 times at 90 to 100° C. with 200 cc. of 5% sodium sulfate solution each time. The yield was 94 g. The product obtained had a hydroxyl number of 229 and contained, on the basis of the ethylene oxide absorption, 5.4 glycol ether radicals in the molecule. The turbidity point in 1% aqueous solution was 82° C., whereas in a solution of 1% of the product in a 5% sodium chloride solution, it had a turbidity point of 58° C.

Example 6

Using an addition product of 4.5 mols of ethylene oxide onto one mol of a terminal aliphatic diol mixture with 11 to 18 carbon atoms in the molecule, prepared in accordance with the procedure of Example 1, liquid preparation of the following composition were produced:

(a)

6% by weight adduct: diol mixture+ethoxyl
16% by weight sulfated addition product of 2 mols ethylene oxide and 1 mol of a $C_{12-14}$ fatty alcohol mixture (sodium salt).
Balance, water.

(b)

16% by weight adduct: diol mixture+ethoxyl
11% by weight tetrapropylene benzenesulfonate (triethanolamine salt)
Balance, water.

(c)

7.5% by weight adduct: diol mixture+ethoxyl
7.5% by weight tetrapropylene benzenesulfonate (sodium salt)
Balance, water.

(d)

11% by weight adduct: diol mixture+ethoxyl
4% by weight tetrapropylene benzenesulfonate (triethanolamine salt)
Balance, water.

(e)

5% by weight adduct: diol mixture+ethoxyl
12% by weight sulfated addition product of 2 mols ethylene oxide and 1 mol of a $C_{12-14}$ fatty alcohol mixture (sodium salt)
13% by weight tetrapropylene benzenesulfonate (sodium salt)
6.5% by weight tetrapropylene benzenesulfonate (triethanolamine salt)
5% by weight ethanol
Balance, water.

Example 7

In order to produce a powdered detergent having the following composition, expressed in percentages by weight of the dry substance:

20% of an addition product of 4.5 mols ethylene oxide and 1 mol of a $C_{10-15}$ diol mixture
2% carboxymethylcellulose
40% sodium pyrophosphate
10% $Na_2O.3.3\ SiO_2$ 28% pentasodium tripolyphosphate, an aqueous suspension containing the pyrophosphate, the polyglycol ether adduct, the alkali silicate and the carboxymethylcellulose is transformed by spray drying into a powder with a residual water content of 7 to 10% by weight. This powder is mixed immediately after its manufacture with a highly voluminous tripolyphosphate having a bulk weight of about 400 grams per liter to provide the desired powdered detergent preparation.

We claim:
1. Detergent preparation which consists essentially of a wash active component selected from the group consisting of synthetic hydrophobic organic wash active anionic sulfate and sulfonate detergents, and mixtures thereof, and a non-ionic surface active polyglycol ether adduct of ethylene oxide and an alkane 1,2-diol having between about 8–26 carbon atoms in the molecule, about 0.1–0.7 ethylene glycol ether radicals being present in the adduct for each carbon atom present in the alkane 1,2-diol radical, said adduct being present in an amount of at least about 5% by weight based on the entire formulation of the detergent preparation, said adduct being present in an amount of at least about 65% by weight based upon the total quantity of said adduct and said wash active component, and said adduct being water-soluble at temperatures of at least about +5° C. and having a turbidity point of between about 20 and 105° C.

2. Preparation according to claim 1 wherein said wash active component is selected from the group consisting of alkyl sulfonates, alkyl benzene sulfonates, fatty acid sulfonates, fatty alcohol sulfates, olefin sulfonates, fatty alcohol polyglycol ether sulfates, fatty acid monoglyceride sulfates, fatty acid diglyceride sulfates, sulfo-succinic acid esters, alkylphenoxy polyglycol ether sulfates, and fatty acid alkylolamide sulfates, in which the corresponding alkyl, fatty and olefin radicals have 8–22 carbon atoms and the corresponding polyglycol radicals have 1–10 glycol moieties.

3. The detergent preparation according to claim 1 wherein about 0.13–0.45 ethylene glycol ether radicals are present in the adduct for each carbon atom present in the alkane 1.2 diol.

References Cited

UNITED STATES PATENTS

| | | | |
|---|---|---|---|
| 1,970,578 | 8/1934 | Schoeller et al. | 260—615 |
| 2,174,761 | 10/1939 | Schuette et al. | 260—615 |
| 2,425,845 | 8/1947 | Toussaint et al. | 260—615 |
| 2,457,139 | 12/1948 | FiFe et al. | 260—615 |
| 2,674,619 | 4/1954 | Lundsted | 260—615 |
| 2,855,367 | 10/1958 | Buck | 252—89 |
| 3,119,848 | 1/1964 | Wrigley et al. | 260—615 |

LEON D. ROSDOL, *Primary Examiner.*

S. D. SCHNEIDER, *Assistant Examiner.*